United States Patent
Yabuzaki

(10) Patent No.: US 9,240,713 B2
(45) Date of Patent: Jan. 19, 2016

(54) SWITCHING POWER SUPPLY DEVICE

(71) Applicant: FUJI ELECTRIC CO., LTD., Kawasaki-shi (JP)

(72) Inventor: Jun Yabuzaki, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 106 days.

(21) Appl. No.: 14/242,927

(22) Filed: Apr. 2, 2014

(65) Prior Publication Data
US 2014/0301118 A1    Oct. 9, 2014

(30) Foreign Application Priority Data
Apr. 3, 2013   (JP) ................................. 2013-078111

(51) Int. Cl.
| H02M 1/44 | (2007.01) |
| H02M 3/335 | (2006.01) |
| H02M 1/00 | (2007.01) |

(52) U.S. Cl.
CPC ............ *H02M 1/44* (2013.01); *H02M 3/33507* (2013.01); *H02M 2001/0019* (2013.01)

(58) Field of Classification Search
CPC ..................... H03K 3/0231; H04B 2215/067
USPC .................. 327/172, 173, 296; 363/21.11, 41
See application file for complete search history.

(56) References Cited

U.S. PATENT DOCUMENTS

| 6,107,851 | A  | 8/2000  | Balakirshnan et al. |
| 6,249,876 | B1 | 6/2001  | Balakrishnan et al. |
| 7,026,851 | B2 * | 4/2006 | Yang ................. H02M 3/33507 327/172 |
| 7,184,283 | B2 * | 2/2007 | Yang ........................ G06F 1/26 323/283 |
| 7,358,821 | B2 * | 4/2008 | Chia ....................... H02M 1/44 331/78 |
| 7,855,586 | B2 * | 12/2010 | Wang ..................... H03K 3/017 327/172 |
| 8,582,324 | B2 * | 11/2013 | Lin ......................... H02M 1/14 363/21.12 |

FOREIGN PATENT DOCUMENTS

JP    2010-245675 A    10/2010

* cited by examiner

*Primary Examiner* — Rajnikant Patel
(74) *Attorney, Agent, or Firm* — Rabin & Berdo, P.C.

(57) ABSTRACT

The invention provides a switching power supply device such that the occurrence of noise is reduced by jitter control of a switching frequency. The switching power supply device includes a switching power supply device main body wherein a predetermined output direct current voltage is obtained by switching an input alternating current voltage using a switching element, a switching control unit that controls the switching frequency in accordance with a feedback voltage that indicates the difference between an output set voltage and the output direct current voltage, a jitter control unit that applies jitter to the switching frequency, and a jitter amplitude control unit that changes jitter amplitude caused by the jitter control unit in accordance with the feedback voltage.

9 Claims, 13 Drawing Sheets

SWITCHING POWER SUPPLY DEVICE

CROSS-REFERENCE TO RELATED APPLICATION

This application claims the benefit of foreign priority of Japanese application 2013-078111, filed Apr. 3, 2013, the disclosure of which is incorporated herein by reference.

BACKGROUND OF THE INVENTION

1. Field of the Invention

The present invention relates to a switching power supply device wherein jitter is applied to the switching frequency, reducing the occurrence of noise.

2. Description of the Background Art

FIG. 10 shows an example of a typical configuration of a switching power supply device (AC/DC converter) that converts an alternating current voltage into a predetermined direct current voltage. The switching power supply device includes, in brief, a switching power supply device main body 1 formed of a switching element (for example, a MOSFET) 4 connected via a primary coil (inductor) 3a of a transformer 3 to a rectifier circuit 2 that rectifies an input alternating current voltage. The switching element 4, when turned on, performs a role of forming a current path between the switching element 4 and the rectifier circuit 2 passing through the primary coil (inductor) 3a. Also, an output capacitor 6 is connected via a diode 5 to a secondary coil 3b of the transformer 3. The diode 5 performs a role of rectifying a voltage generated by the secondary coil 3b of the transformer 3 when the switching element 4 is turned off, thus charging the output capacitor 6, and generating a predetermined output direct current voltage Vout via the output capacitor 6.

Reference sign 10 in the drawing is a control circuit (control IC) that drives the switching element 4 on and off, thus controlling current flowing through the primary coil 3a of the transformer 3. Also, reference sign 8 is an output voltage detector circuit that detects the difference between the output direct current voltage Vout detected via resistors Ra and Rb and an output set voltage. The voltage difference detected by the output voltage detector circuit 8 is provided via a photocoupler 9 to the control circuit 10 as a feedback voltage FB. Further, the control circuit 10, basically, controls the switching frequency of the switching element 4 in accordance with the feedback voltage FB, thereby evening the output direct current voltage Vout.

FIG. 11 is a main portion schematic configuration diagram showing an example of the control circuit 10. The control circuit 10, in brief, includes an oscillator circuit (OSC) 11, which oscillates at a frequency in accordance with the feedback voltage FB, and an output buffer 12 that drives the switching element 4 on and off in accordance with the output of the oscillator circuit 11. Also, the control circuit 10 includes a start-up circuit 13 that detects the input alternating current voltage, which is applied to a terminal VH, starts up an internal power supply generator circuit (not shown), and starts up the output buffer 12. The internal power supply generator circuit and output buffer 12, after being started up by the start-up circuit 13, operate by a voltage generated by an auxiliary coil 3c of the transformer 3 being input from a terminal VCC.

Furthermore, the control circuit 10 includes an overcurrent detector circuit 14 that detects an overcurrent by current flowing through the switching element 4 being input via a terminal CS, and includes an overheat detector circuit 15 that detects an overheat of the control circuit 10 via a terminal LAT. The overcurrent detector circuit 14 and the overheat detector circuit 15 cause the drive of the switching element 4 to stop by prohibiting the operation of the output buffer 12. Because of this, the switching power supply device main body 1 is protected from overcurrent and overheat trouble. As these protective functions are not directly related to the invention, a detailed description thereof will be omitted.

Continuing, the oscillator circuit 11 in the control circuit 10 includes a buffer amplifier (AMP1) 11a that detects the feedback voltage FB, and an amplifier (AMP2) 11b that controls current flowing through a transistor (n-channel MOSFET) q1 in accordance with the output of the buffer amplifier 11a. The transistor q1 includes as a load a current minor circuit formed of transistors (p-channel MOSFETs) q2 and q3. An output current of the current minor circuit is provided to a transistor (n-channel MOSFET) q4, which acts as a load of the current minor circuit, and used to control current flowing through a transistor (n-channel MOSFET) q10. Furthermore, the output current of the current minor circuit is used to control current flowing through a transistor (p-channel MOSFET) q7 via a transistor (n-channel MOSFET) q5 and a transistor (p-channel MOSFET) q6.

The transistors q7 and q10 are connected in series via transistors (p-channel and n-channel MOSFETs) q8 and q9, which are controlled so as to be turned on and off in a complementary way. Further, a capacitor C is connected to a series connection point of the transistors q8 and q9. The transistor q8 performs a role of charging the capacitor C using current flowing through the transistor q7 when carrying out an on-state operation. Also, the transistor q9 performs a role of discharging the capacitor C using current flowing through the transistor q10 when carrying out an on-state operation.

Further, a hysteresis comparator 11c compares the charging and discharging voltages of the comparator C and a predetermined reference voltage Vref, and generates a pulse signal that forms a reference for driving the switching element 4 on and off. The output (pulse signal) of the hysteresis comparator 11c is provided to the output buffer 12, and the switching element 4 is driven on and off by the output buffer 12. Also, at the same time, the output of the hysteresis comparator 11c is used as a control signal that drives the transistors q8 and q9 on and off in a complementary way, and as a clock signal that regulates the action of a jitter control circuit 20.

Herein, the jitter control circuit 20 includes a plurality (four) of transistors (p-channel MOSFETs) q11 to q14 that form a parallel current mirror circuit with the transistor q7, and transistors (p-channel MOSFETs) q21 to q24 connected in series to the transistors q11 to q14 respectively, as shown in, for example, FIG. 12. The transistors q21 to q24 are controlled so as to be turned on or off by receiving outputs Q0 to Q3 of an up/down counter 21, and perform a role of selectively drawing current flowing through the transistors q11 to q14, and applying the current to the transistor q5.

The currents flowing through the transistors q11 to q14 are set as, for example, I1, I2 (=2·I1), I3 (=2·I2=4·I1), and I4 (=2·I3=4·I2=8·I1) respectively. These current ratios are set by changing the area ratios of the transistors q11 to q14, each of which forms a current mirror circuit with the transistor q7.

Also, the up/down counter 21 receives the output of a divider 22 that divides the output (pulse signal) of the hysteresis comparator 11c, and carries out a counting operation. Further, the up/down counter 21 alternately repeats operations of counting up (increment of +1) and counting down (decrement of −1) a count value thereof. As a result of this, for example, the 4-bit up/down counter 21 causes the outputs Q0 to Q3 thereof to vary sequentially and reversibly within a range of, for example, [0000] to [1111]. The transistors q21 to q24 are selectively controlled so as to be turned on or off by the outputs Q0 to Q3 of the up/down counter 21. Further, the currents flowing through the transistors q11 to q14 are selectively output by a selective on-state operation of the transistors q21 to q24.

As a result of this, an output current b of the jitter control circuit 20 varies in step form (triangular wave form), and the output current b is applied to the transistor q4. Further, a step-form (triangular wave-form) variation is applied to the current that charges the capacitor C, and a cyclical variation is applied to the time for charging the capacitor C as far as the reference voltage Vref. As a result of this, cyclical fluctuation of a constant width is applied to the frequency of the pulse signal output via the hysteresis comparator 11c. Control of this kind of oscillation frequency is jitter control of the switching frequency that drives the switching element 4. Further, the frequency of high frequency noise that occurs in accompaniment to a switching of the switching element 4 is diffused by the jitter control, because of which the high frequency noise is reduced (for example, refer to U.S. Pat. No. 6,249,876).

SUMMARY OF THE INVENTION

However, the control circuit 10, basically, includes a function whereby the switching frequency is caused to vary in accordance with the size of the load. Specifically, when the load is of a certain value or higher, the switching element 4 is driven at a maximum oscillation frequency so that the output power increases, while the switching frequency is reduced along with a decrease in the load below the certain value, thus increasing switching efficiency. Also, the size of the load is detected from the feedback voltage FB.

Meanwhile, on the switching frequency being increased by the jitter control, there is an accompanying increase in the output power, and the output voltage rises. Conversely, on the switching frequency decreasing, the output power decreases, and the output voltage drops. In practice, however, the output voltage is kept constant by feedback control of the switching frequency based on the feedback voltage FB. Further, when the switching power supply device main body 1 is operating in a region A in which the load is of a certain value or higher, and in a region C in which the load is of a certain value or lower, as shown in FIG. 13, the output voltage is kept constant by the switching cycle duty ratio varying, even when the switching frequency is varied by the jitter control.

However, when the load is within a certain range (region B shown in FIG. 13), the feedback voltage FB varies in accordance with variation in the switching frequency accompanying the jitter control, because of which the control circuit 10 operates so as to keep the output voltage constant by causing the switching frequency and switching cycle duty ratio to vary simultaneously. At this time, the amount of switching frequency fluctuation caused by variation in the feedback voltage FB acts so as to cancel out the amount of switching frequency fluctuation caused by jitter control. As a result of this, the variation range of jitter amplitude, that is, of the switching frequency, caused by jitter control decreases, and a problem occurs in that the high frequency noise reduction effect is lost.

The invention, having been contrived bearing in mind this kind of situation, has an object of providing a switching power supply device such that it is possible to reduce the occurrence of high frequency noise under jitter control, regardless of load fluctuation.

In order to achieve the heretofore described object, the invention is such that the switching frequency jitter amplitude caused by jitter control is increased in accordance with the feedback voltage FB when the feedback voltage FB varies in accompaniment to a load fluctuation (region B), as shown in outline in FIG. 1. Further, the invention is characterized in that the high frequency noise reduction effect caused by jitter control of the switching frequency is maintained by controlling the expansion of the jitter amplitude, because of which high frequency noise is reduced regardless of load fluctuation.

That is, a switching power supply device according to the invention includes a switching power supply device main body that switches an input alternating current voltage using a switching element, generating a predetermined output direct current voltage, a switching control unit that controls the switching frequency of the switching element in accordance with feedback voltage that indicates the difference between an output set voltage and the output direct current voltage, stabilizing the output direct current voltage, a jitter control unit that applies jitter to the switching frequency, reducing the occurrence of noise accompanying a switching operation of the switching element, and a jitter amplitude control unit that changes the jitter amplitude caused by the jitter control unit in accordance with the feedback voltage, maintaining the noise reduction effect.

Preferably, the jitter amplitude control unit is configured so as to widen the jitter amplitude when the feedback voltage is within a preset voltage range. Specifically, the preset voltage range of the feedback voltage is set as a range up to and including a first threshold voltage at which the switching frequency begins to decrease in accompaniment to a decrease in the feedback voltage. Alternatively, the preset voltage range of the feedback voltage is set as a range above and including a second threshold voltage at which the switching frequency begins to rise in accompaniment to a rise in the feedback voltage.

More preferably, the preset voltage range of the feedback voltage is set as a range between the first threshold voltage at which the switching frequency begins to decrease in accompaniment to a decrease in the feedback voltage and the second threshold voltage, lower than the first threshold voltage, at which the switching frequency begins to rise in accompaniment to a rise in the feedback voltage.

Further, the jitter amplitude control unit is configured so as to determine whether or not the feedback voltage is included in the preset voltage range, and change the jitter amplitude, in steps for example, between a reference amplitude and an expanded amplitude of an amplitude wider than the reference amplitude. Also, the determination of whether or not the feedback voltage is included in the preset voltage range is carried out using a comparator having predetermined hysteresis characteristics.

Alternatively, the jitter amplitude control unit may be configured so as to increase the jitter amplitude incrementally from a reference amplitude to an expanded amplitude of an amplitude wider than the reference amplitude in accordance with the feedback voltage when the feedback voltage is included in the preset voltage range, and reduce the jitter amplitude incrementally from the expanded amplitude to the reference amplitude in accordance with the feedback voltage when the feedback voltage is outside the preset voltage range.

The switching control unit is preferably configured so as to control a duty ratio that drives the switching element on and off in accordance with the feedback voltage, causing the switching frequency to vary.

According to the switching power supply device configured as heretofore described, the switching frequency variation range caused by the jitter control, that is, the jitter amplitude, is set on the large side when the amount of switching frequency fluctuation caused by feedback control accompanying a load fluctuation cancels out the amount of switching frequency fluctuation caused by jitter control. As a result of this, it is possible to prevent a reduction in jitter amplitude even when load fluctuation occurs, and thus possible to effectively maintain the effect of reducing high frequency noise caused by jitter control. That is, it is possible to stably reduce the occurrence of high frequency noise, regardless of load fluctuation.

Further, secondarily, as it is possible to reduce noise level, there are considerable practical advantages, such as it being possible to achieve simplification of a noise eliminating filter.

DETAILED DESCRIPTION OF THE INVENTION

Figure 1:
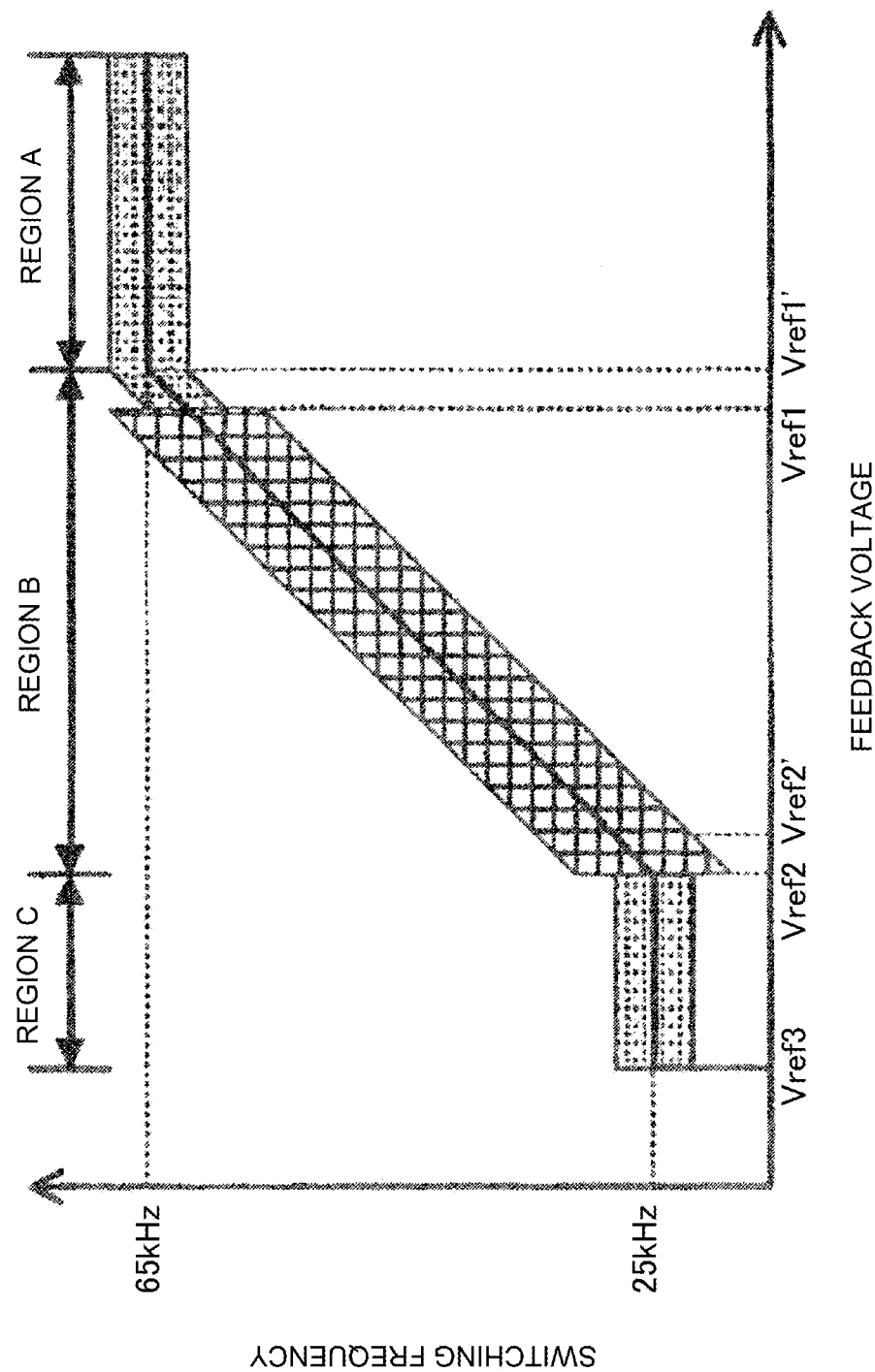
FIG. 1 shows an outline of a jitter control of the invention.

Hereafter, referring to the drawings, a description will be given of a switching power supply device (AC/DC converter) according to embodiments of the invention.

Figure 10:
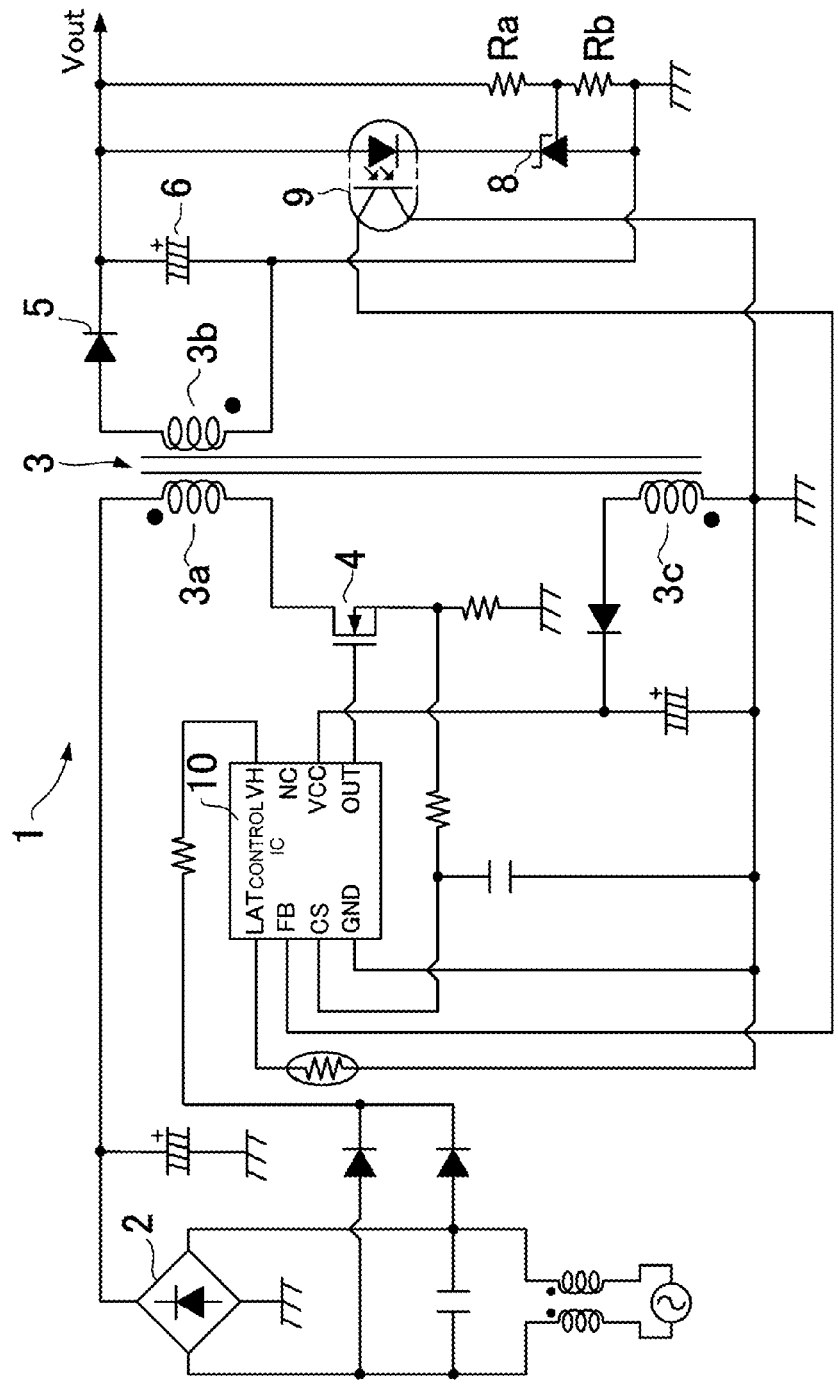
FIG. 10 is a schematic configuration diagram of a heretofore known general switching power supply device.
Figure 11:
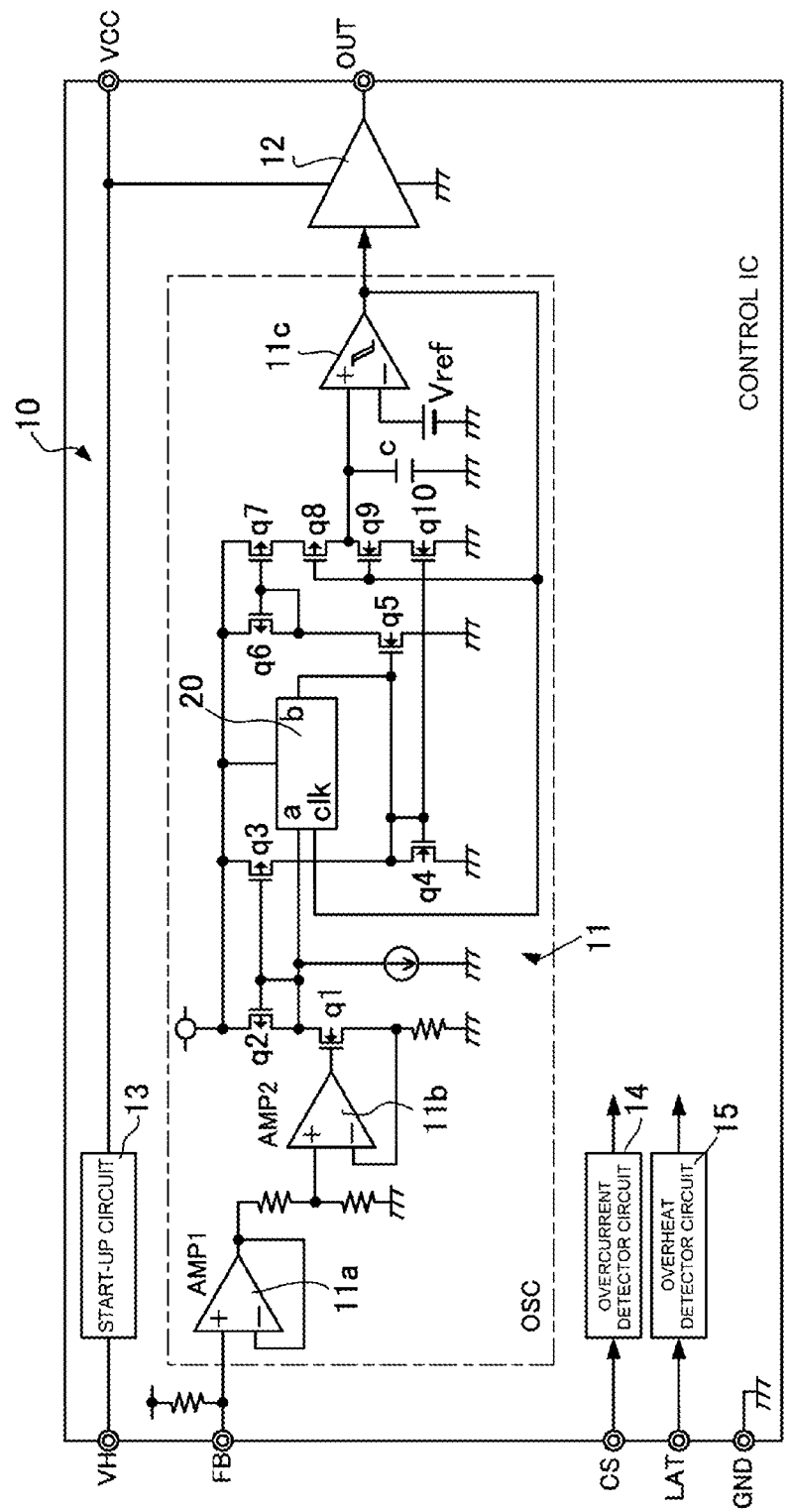
FIG. 11 is a main portion schematic configuration diagram showing an example of a control circuit used in a switching power supply device.
Figure 12:
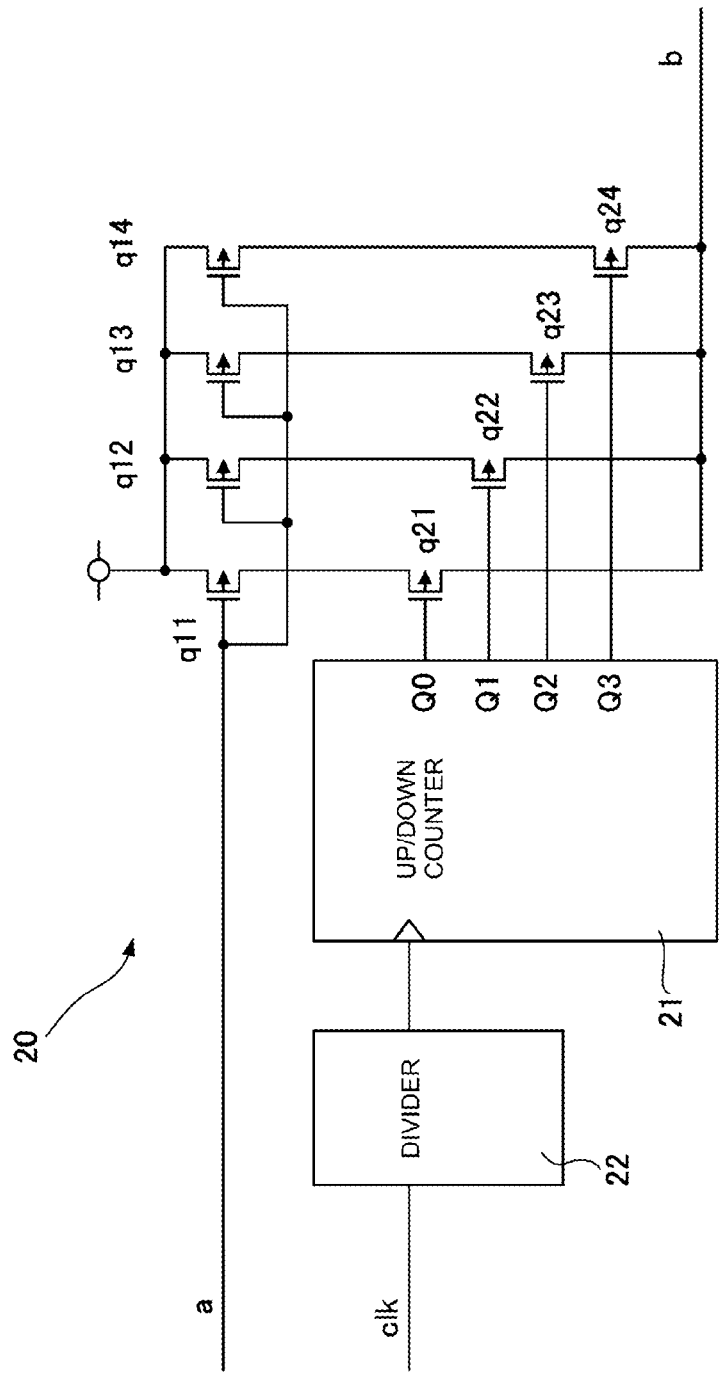
FIG. 12 is a diagram showing an example of a configuration of a heretofore known general jitter control circuit.
Figure 13:
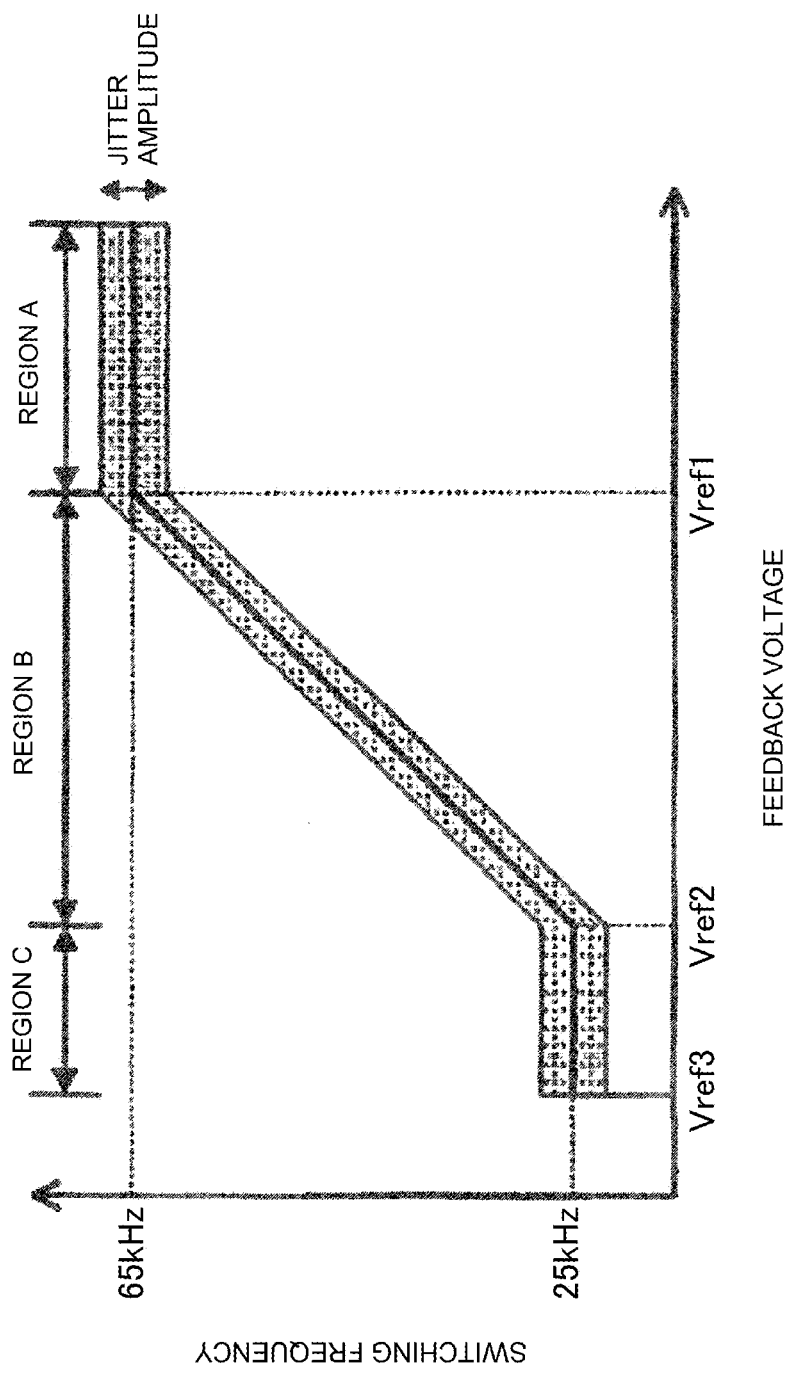
FIG. 13 is a diagram showing the relationship between switching frequency variation with respect to feedback voltage and jitter amplitude.

A switching power supply device main body 1 according to the invention is basically configured as shown in FIG. 10. Also, a control circuit 10 in the switching power supply device main body 1 is basically configured as shown in FIG. 11. Consequently, the same reference signs are given to portions that are the same, and redundant descriptions are omitted.

Figure 2:
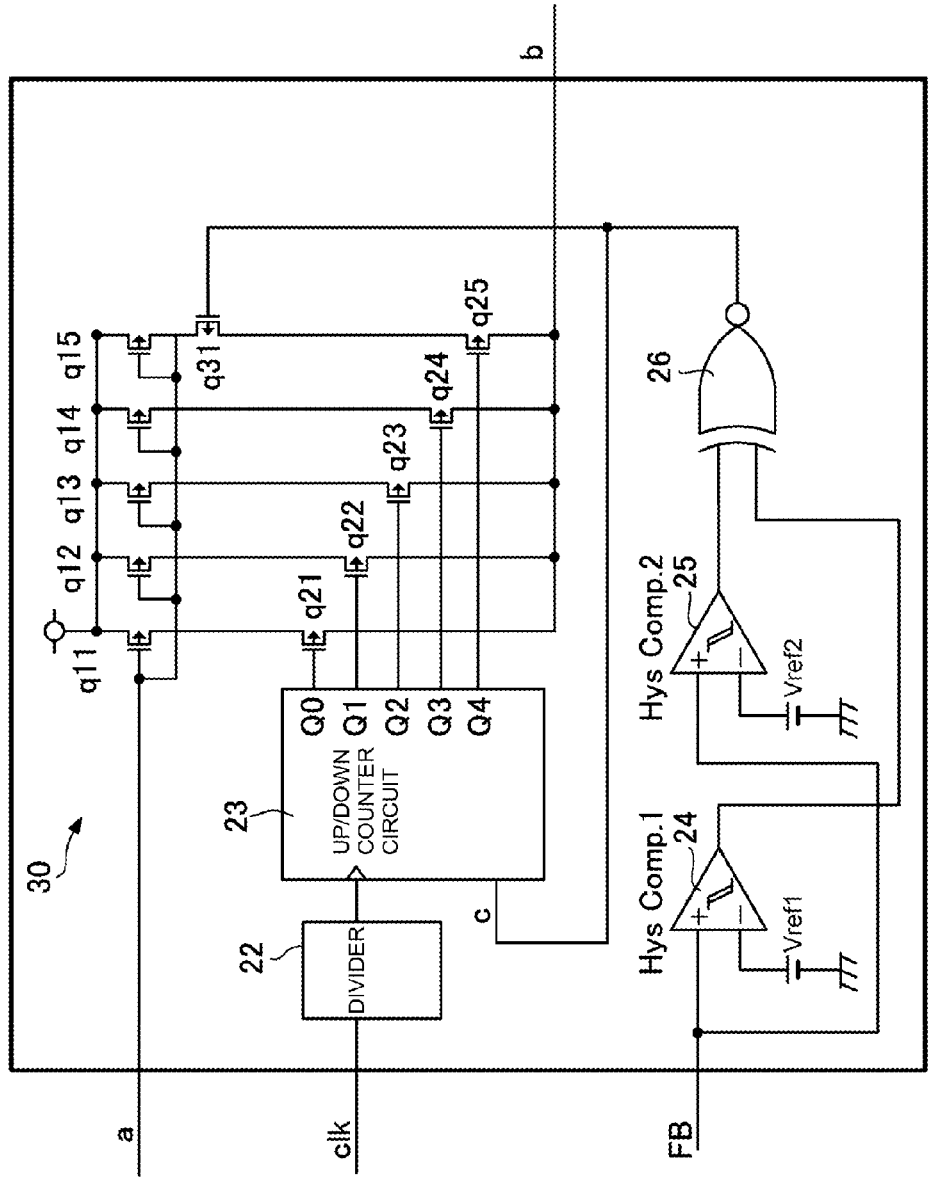
FIG. 2 is a diagram showing a schematic configuration of a jitter control circuit in a switching power supply device according to a first embodiment of the invention.

FIG. 2 shows a schematic configuration of a jitter control circuit 30, which is a characteristic portion of the switching power supply device main body 1 according to a first embodiment of the invention. The jitter control circuit 30 includes a 5-bit up/down counter circuit 23, in place of a 4-bit up/down counter 21 in a jitter control circuit 20. Furthermore, the jitter control circuit 30 includes a plurality of (five) of transistors q11 to q15 (p-channel MOSFETs) that form a parallel current mirror circuit with a transistor q2, and transistors q21 to q25 (p-channel MOSFETs) connected in series to the transistors q11 to q15 respectively. Further, the jitter control circuit 30 is configured so that the transistors q21 to q25 are selectively controlled so as to be turned on or off by outputs Q0 to Q4 of the up/down counter circuit 23.

Also, the jitter control circuit 30 includes first and second hysteresis comparators 24 and 25 that detect the size of a feedback voltage FB. The first hysteresis comparator 24 compares the feedback voltage FB and preset first reference voltages Vref1 and Vref1'. For details, Vref1 represents the first reference voltage and Vref1' represents a voltage having the first reference voltage and a voltage corresponding to a hysteresis width of the first hysteresis comparator 24. (Vref1+Vref1') is a voltage corresponding to the hysteresis width in other words. However, both Vref1 and Vref1' are referred to as a first reference voltage for the sake of convenience. Further, the first hysteresis comparator 24 outputs an "H" level signal when the feedback voltage FB exceeds the first reference voltage Vref1', and outputs an "L" level signal when the feedback voltage FB is lower than the first reference voltage Vref1.

Also, the second hysteresis comparator 25 compares the feedback voltage FB and preset second reference voltages Vref2 and Vref2'. For details, Vref2 corresponds to the second reference voltage and Vref2' corresponds to a voltage having the second reference voltage and a voltage corresponding to the hysteresis width of the second hysteresis comparator 25. (Vref2+Vref2') is a voltage corresponding to the hysteresis width of the second hysteresis comparator 25 in other words. However, both Vref2 and Vref2' are referred to as a second reference voltage for the sake of convenience. Further, the second hysteresis comparator 25 outputs an "L" level signal when the feedback voltage FB exceeds the second reference voltage Vref2', and outputs an "H" level signal when the feedback voltage FB is lower than the second reference voltage Vref2.

Further, the outputs of the first and second hysteresis comparators 24 and 25 are output via an exclusive logical sum circuit (EX-NOR) 26 as control signals for the up/down counter circuit 23. Consequently, the output of the exclusive logical sum circuit 26 is at the "L" level only when the feedback voltage FB exceeds the second reference voltage Vref2' and is lower than the first reference voltage Vref1, that is, only when the load fluctuation indicated in region B occurs. Further, the output of the exclusive logical sum circuit 26 is maintained at the "H" level when the feedback voltage FB is lower than the second reference voltage Vref2 (region C) and when the feedback voltage FB exceeds the first reference voltage Vref1' (region A).

At the same time, the output of the exclusive logical sum circuit 26 is provided as a signal that controls a transistor q31 (a p-channel MOSFET) connected in series to the transistor q25 so as to be turned on or off. Consequently, the transistor q25, which is controlled so as to be turned on or off by the output Q4 of the up/down counter circuit 23, is such that current flowing through the transistor q25 is drawn and output only when the transistor q31 is carrying out an on-state operation. The current flowing through the transistor q25 is set to be, for example, twice as large as current flowing through the transistor q24.

Figure 3:
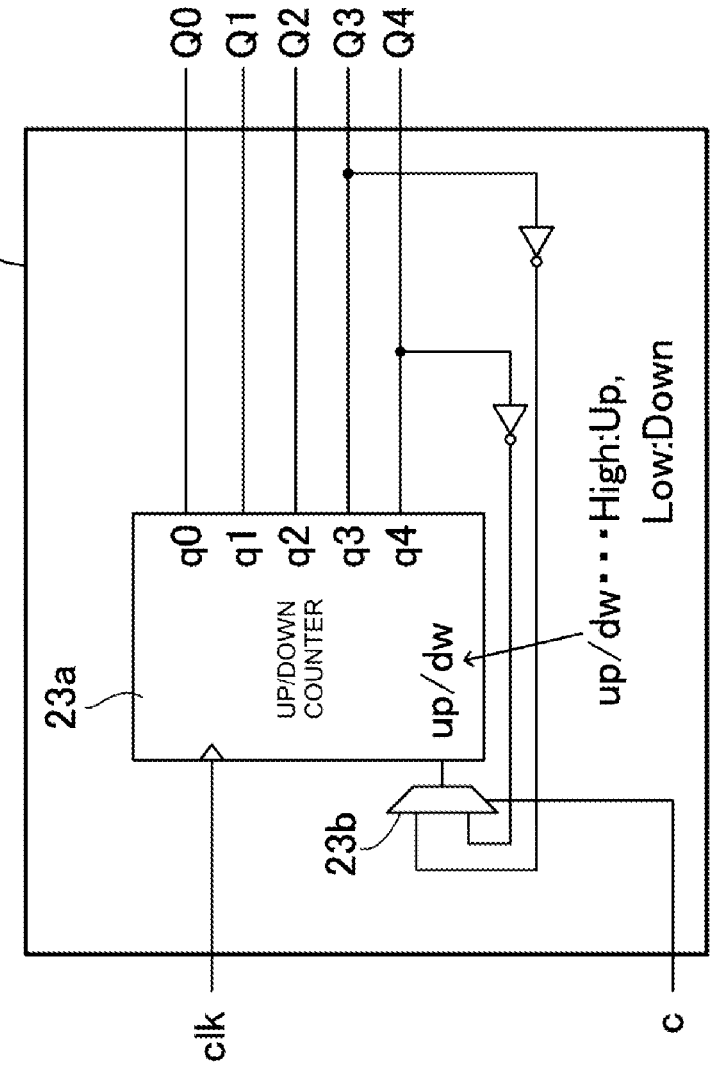
FIG. 3 is a diagram showing an example of a specific configuration of an up/down counter circuit in the jitter control circuit shown in FIG. 2.

Herein, the up/down counter circuit 23 includes, specifically, a 5-bit up/down counter 23a, as shown in FIG. 3. Operation of the up/down counter 23a is controlled via a selector 23b, which is controlled by the output of the exclusive logical sum circuit 26, in accordance with an output QQ of the up/down counter 23a. Specifically, control is carried out so that a counting up (+1) operation is carried out in accordance with the output Q3 of the up/down counter 23a or a counting down (−1) operation is carried out in accordance with the output Q4 of the up/down counter 23a.

According to the switching power supply device main body 1 configured to include the jitter control circuit 30 configured in this way, the output of the exclusive logical sum circuit 26 is maintained at the "H" level when the feedback voltage FB is high, and the switching frequency is set to the maximum oscillation frequency (region A), in a rated load state. Also, the output of the exclusive logical sum circuit 26 is also maintained at the "H" level when the load becomes lighter, the feedback voltage FB decreases, and the switching frequency is set to the minimum oscillation frequency (region C).

Consequently, in each of these states (regions A and C), the up/down counter circuit 23 functions as a 4-bit up/down counter, causing only the outputs Q0 to Q3 thereof to vary. Further, the output Q4 of the up/down counter circuit 23 is maintained at, for example, the "H" level. At the same time, as the output of the exclusive logical sum circuit 26 is at the "H" level, the transistor q31 is maintained in an off-state. As a result of this, the jitter control circuit 30, operating in the same way as the heretofore known jitter control circuit 20, causes an output current b thereof to vary cyclically in step form (triangular wave form) within a predetermined variation range.

As opposed to this, the output of the exclusive logical sum circuit 26 is at the "L" level in a state wherein the switching frequency varies in accompaniment to a load fluctuation (region B). Thereupon, the up/down counter 23a in the up/down counter circuit 23 functions as a 5-bit up/down counter. Further, as the output of the exclusive logical sum circuit 26 is at the "L" level, the transistor q31 is set in an on-state.

As a result of this, the transistors q21 to q25, receiving the outputs Q0 to Q4 of the up/down counter circuit 23, selectively carry out an on-state operation. Further, currents regulated by the transistors q11 to q15 respectively are selectively output via the transistors q21 to q25, and the output current b from the jitter control circuit 30 varies in step form (triangular wave form). Moreover, as the current from the transistor q15 is added, the variation range of the output current b at this time is expanded in comparison with that when there is a 4-bit operation. Further, the time required for charging or discharging a capacitor C, controlled so as to be charged or discharged in accordance with the reference voltage Vref, is changed considerably. As a result of this, the variation range of the frequency of a pulse signal generated via a hysteresis comparator 11c increases.

Consequently, according to the switching power supply device main body 1 configured to include the jitter control circuit 30 configured in this way, the variation range (jitter amplitude) of the jitter frequency with respect to the switching frequency is expanded when reaching a state wherein the switching frequency varies in accompaniment to a load fluctuation (region B). As a result of this, even when the amount of switching frequency fluctuation caused by feedback control accompanying a load fluctuation acts so as to cancel out the amount of switching frequency fluctuation caused by jitter control, it is possible to sufficiently secure the variation range (jitter amplitude) of the switching frequency caused by jitter control. Consequently, it is possible to maintain an effect of reducing high frequency noise using jitter control, regardless of the switching frequency feedback control. In other words, it is possible to compensate for a reduction in the effect of reducing high frequency noise using jitter control, thus stably reducing the occurrence of high frequency noise, regardless of the load fluctuation.

Figure 4:
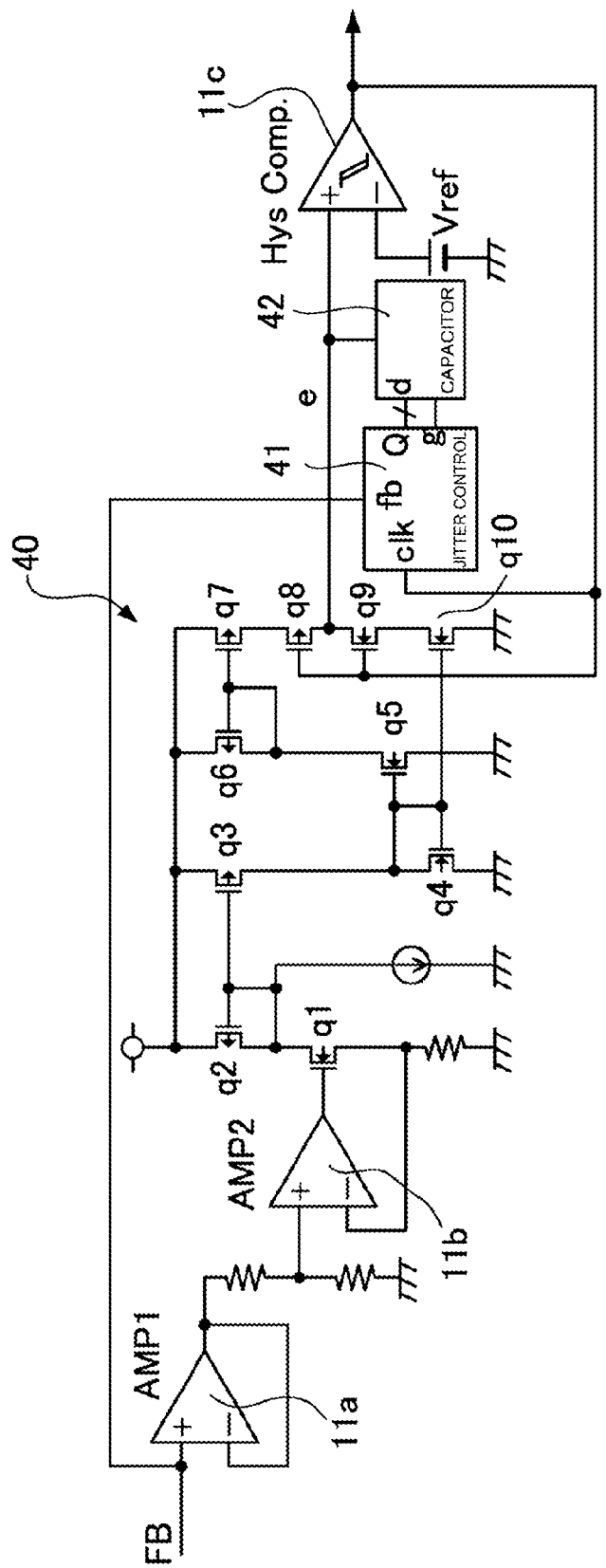
FIG. 4 is a diagram showing a schematic configuration of a jitter control circuit in a switching power supply device according to a second embodiment of the invention.

FIG. 4 shows a schematic configuration of an oscillator circuit 40, provided in the control circuit 10, which is a characteristic portion of the switching power supply device main body 1 according to a second embodiment of the invention. The oscillator circuit 40 corresponds to an oscillator circuit 11. Specifically, the oscillator circuit 40 is configured to include a jitter control circuit 41, such as that shown in FIG. 5, and a capacitor circuit 42, such as that shown in FIG. 6, in place of the jitter control circuits 20 and 30 that control the current b applied to the transistor q5. The same reference signs are given to portions that are the same as those in the oscillator circuit 11, and descriptions thereof are omitted.

Figure 5:
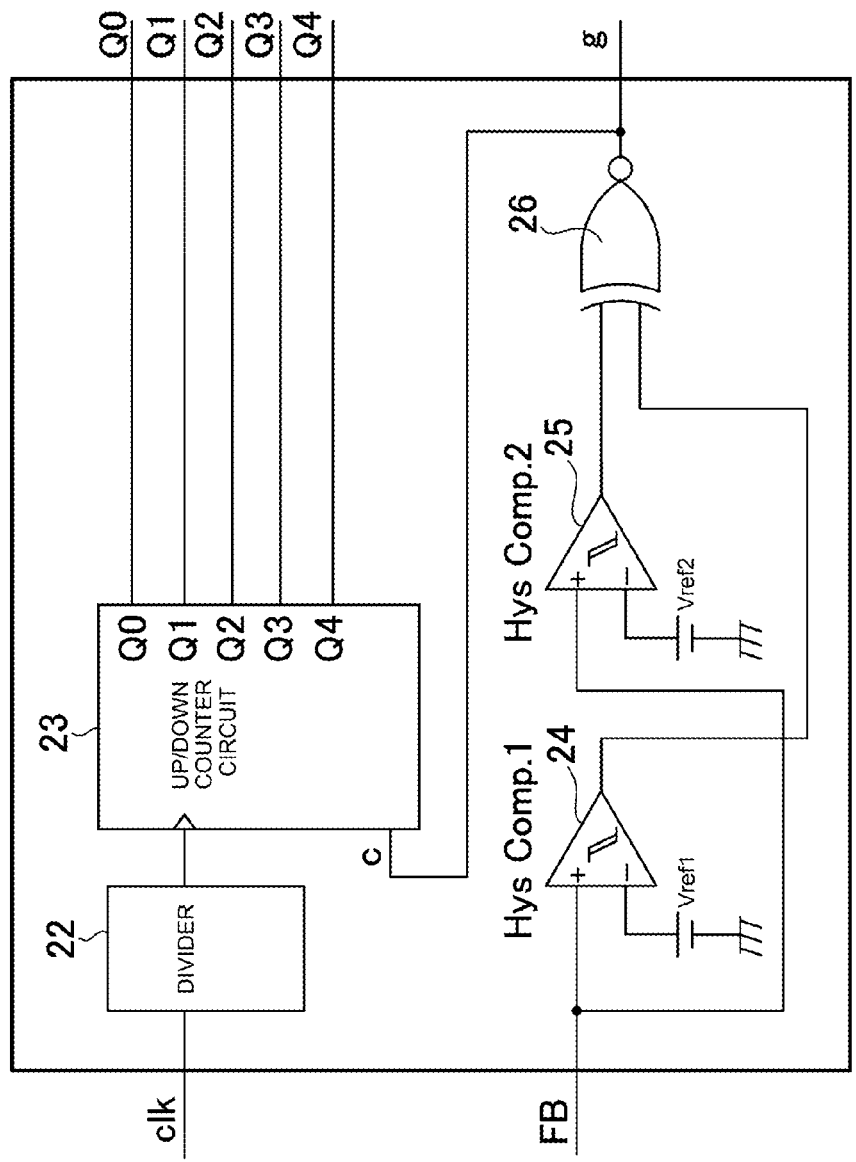
FIG. 5 is a diagram showing an example of a specific configuration of an up/down counter circuit in the jitter control circuit shown in FIG. 4.
Figure 6:
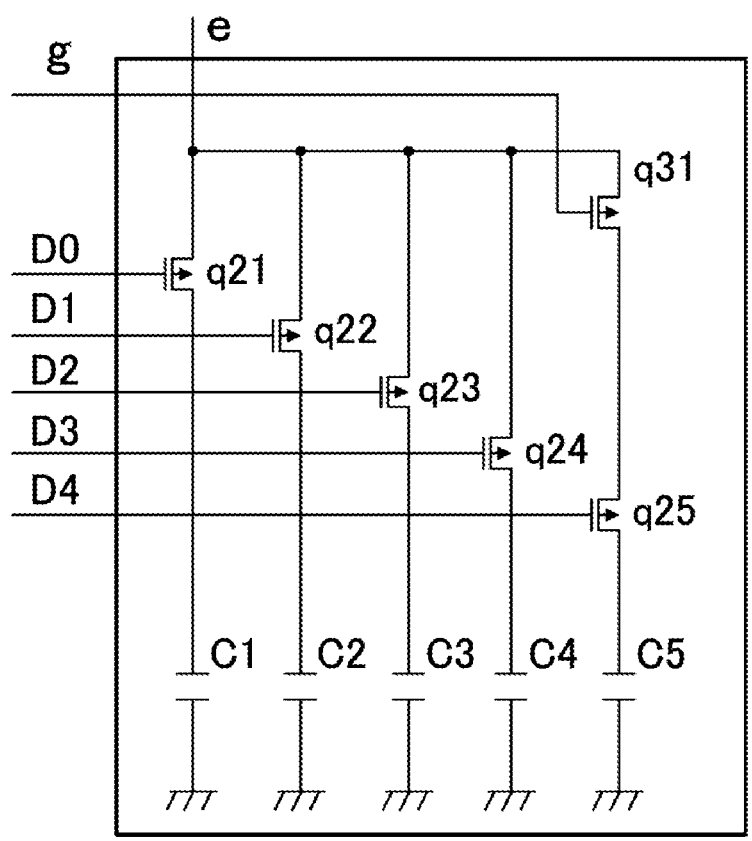
FIG. 6 is a diagram showing an example of a specific configuration of a capacitor circuit in the jitter control circuit shown in FIG. 4.

The jitter control circuit 41, as shown in FIG. 5, is configured as a circuit such that the transistors q11 to q15, q21 to q25, and q31 are removed from the jitter control circuit 30 shown in FIG. 2. Further, the oscillator circuit 40 is characterized by being configured so that the transistors q21 to q25 and q31 are provided in the capacitor circuit 42, as shown in FIG. 6, and a plurality of capacitors C1 to C5, which form a main portion of the capacitor circuit 42, are selectively connected to connection points of transistors q8 and q9.

That is, the plurality of capacitors C1 to C5 are selectively connected in parallel via the transistors q21 to q25 and q31, and used for charging and discharging by the transistor q7 and a transistor q10. Also, the electrostatic capacity of each of the capacitors C1 to C5 is set to, for example, c1, c2 (=2·c1), c3 (=2·c2), c4 (=2·c3), and so on. Consequently, the capacitors C1 to C5 correspond to the capacitor C, whose electrostatic capacity is variably set.

Further, the jitter control circuit 41 is such that the up/down counter circuit 23 is caused to essentially function as a 4-bit up/down counter, in the same way as in the previous embodiment, in the previously described state wherein the switching frequency is set to the maximum oscillation frequency (region A) in a rated load state, and the state wherein the switching frequency is set to the minimum oscillation frequency (region C) when there is a light load. Consequently, the jitter control circuit 41 controls only the transistors q21 to q24 so as to be selectively turned on and off, and maintains the transistor q25 in an off-state. As a result of this, by only the capacitors C1 to C4 being selectively used, charging and discharging thereof is controlled.

As opposed to this, the up/down counter circuit 23 functions as a 5-bit up/down counter, in the same way as in the previous embodiment, in a state wherein the switching frequency varies in accompaniment to a load fluctuation (region B). Further, as the output of the exclusive logical sum circuit 26 is at the "L" level, the transistor q31 is set to an on-state.

As a result of this, the transistors q21 to q25, receiving the outputs Q0 to Q4 of the up/down counter circuit 23, selectively carry out an on-state operation. Further, charging and discharging is controlled by selective use of the capacitors C1 to C5. At this time, the electrostatic capacity as the capacitor C is changed considerably in accordance with the capacitors C1 to C5 selectively connected in parallel via the transistors q21 to q25, in accompaniment to which the time required for the charging or discharging thereof also varies considerably.

Further, in the same way as in the previous embodiment, the variation range of the frequency of the pulse signal generated via the hysteresis comparator 11c can be set to be greater than in the case of the operating states shown in regions A and C. Therefore, the same advantage is obtained in the second embodiment as in the first embodiment.

Figure 7:
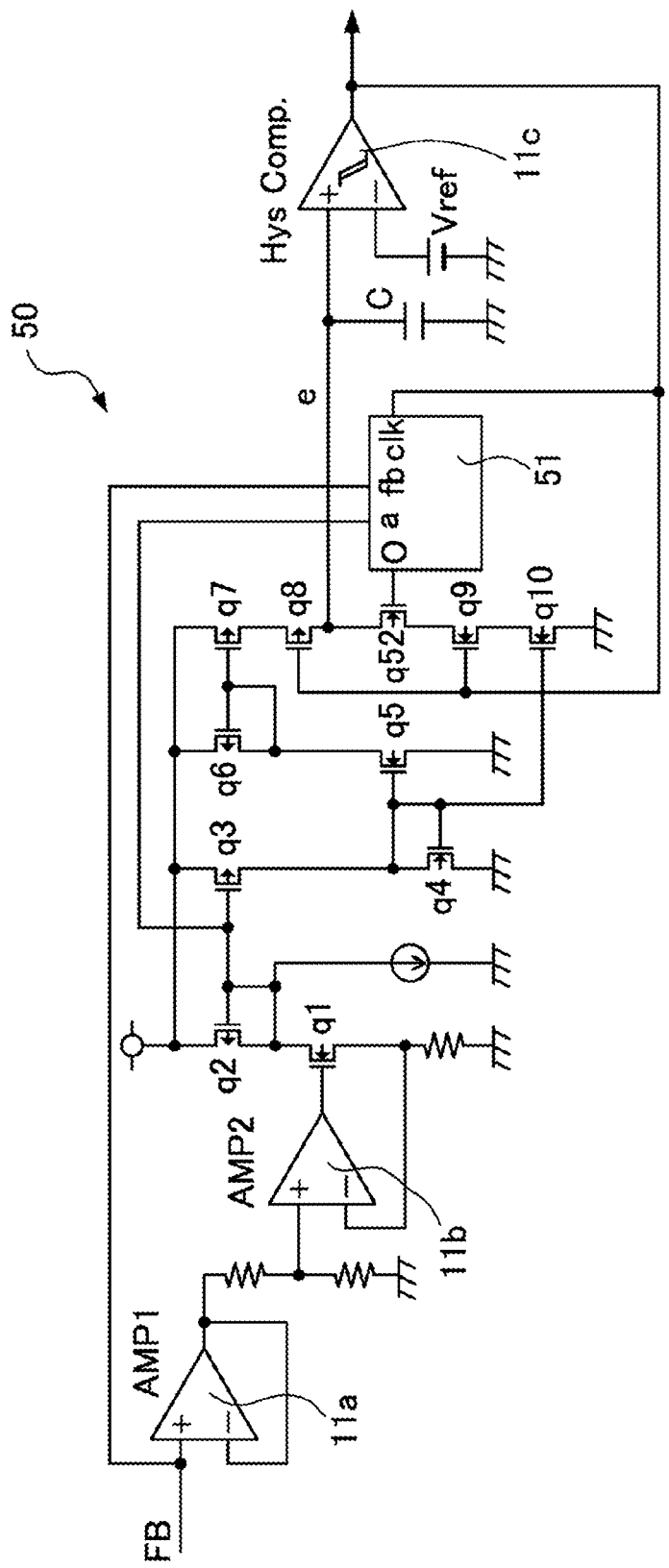
FIG. 7 is a diagram showing a schematic configuration of an oscillator circuit in a switching power supply device according to a third embodiment of the invention.

FIG. 7 shows a schematic configuration of an oscillator circuit 50, provided in the control circuit 10, which is a characteristic portion of the switching power supply device main body 1 according to a third embodiment of the invention. The oscillator circuit 50 corresponds to the oscillator circuit 11. Specifically, the oscillator circuit 50 includes a jitter control circuit 51, such as that shown in FIG. 8, in place of the jitter control circuits 20 and 30 that control the current b applied to the transistor q5. Furthermore, the oscillator circuit 50 includes a charging and discharging transistor q52 interposed between the transistors q8 and q9.

Further, the oscillator circuit 50 is such that, basically, the capacitor C is charged and discharged using current set in accordance with the feedback voltage FB, that is, using current set in the transistors q7 and q10. At this time, the transistor q52 is controlled so as to be turned on or off by an output signal o of the jitter control circuit 51, thus controlling the discharging of the capacitor C. In particular, the jitter control circuit 51, by controlling the transistor q52 so as to be turned on or off, performs a role of variably setting the time between completing charging and starting discharging of the capacitor C, as will be described hereafter.

Figure 8:
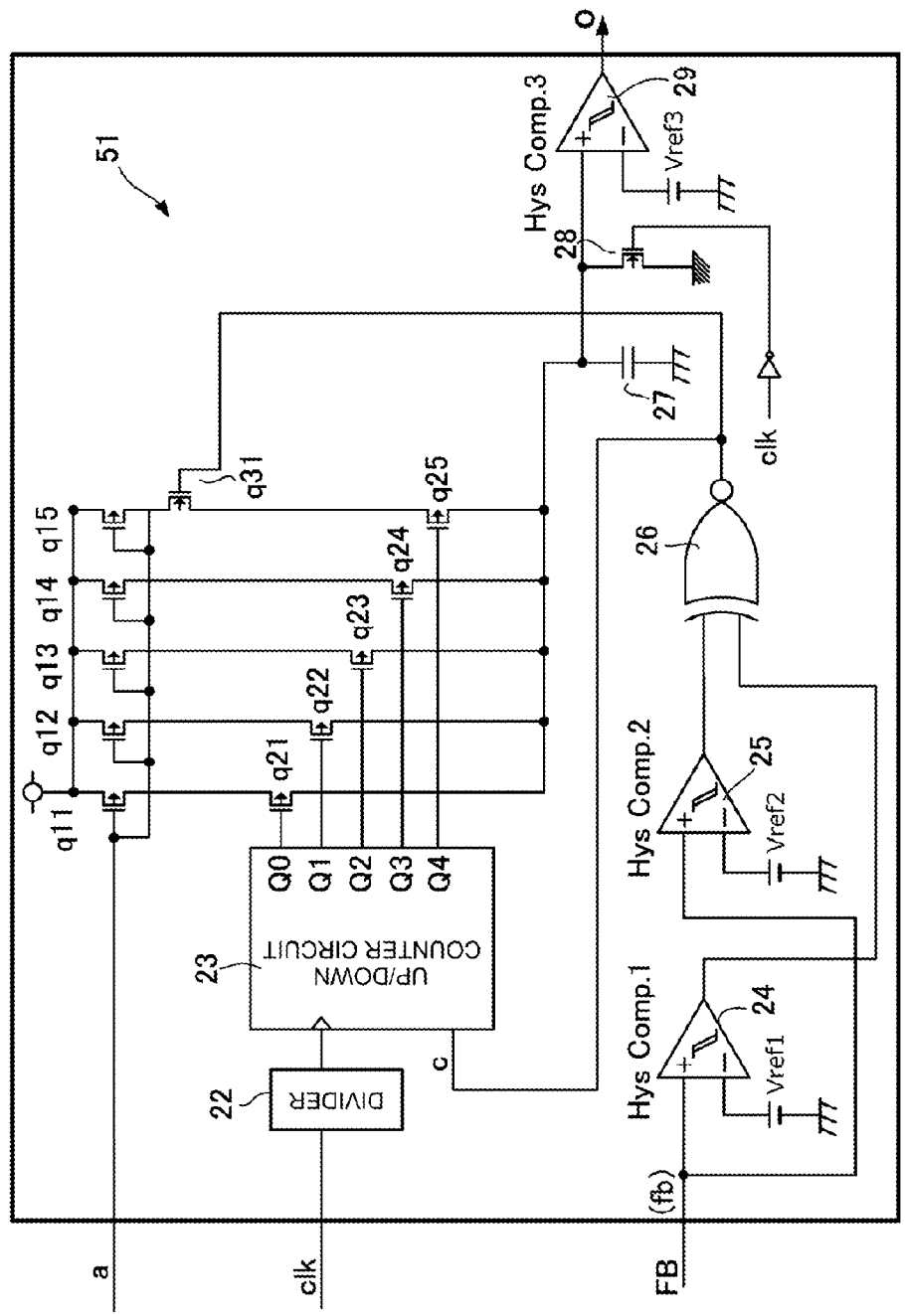
FIG. 8 is a diagram showing an example of a specific configuration of a jitter control circuit in the oscillator circuit shown in FIG. 7.

That is, the jitter control circuit 51 includes, in addition to the configuration of the jitter control circuit 30 shown in FIG. 2, an auxiliary capacitor 27 charged by an output current that passes selectively through the transistors q21 to q25, as shown in, for example, FIG. 8. Furthermore, the jitter control circuit 51 is configured to include a transistor 28 that controls the discharging of the auxiliary capacitor 27, and to include a third hysteresis comparator 29 that causes the transistor q52 to be turned off when the charging voltage of the auxiliary capacitor 27 exceeds a reference voltage Vref3.

The jitter control circuit 51 configured in this way controls the charging and discharging of the auxiliary capacitor 27 in synchronization with the output (clock signal) of the hysteresis comparator 11c. Further, the third hysteresis comparator 29 allows discharging of the capacitor C by causing the transistor q52 to carry out an on-state operation when the charging voltage of the auxiliary capacitor 27 reaches the reference voltage Vref3. In other words, the third hysteresis comparator 29 maintains the transistor q52 in an off-state, thus prohibiting discharge of the capacitor C, for a period until the charging voltage of the auxiliary capacitor 27 reaches the reference voltage Vref3.

Figure 9:
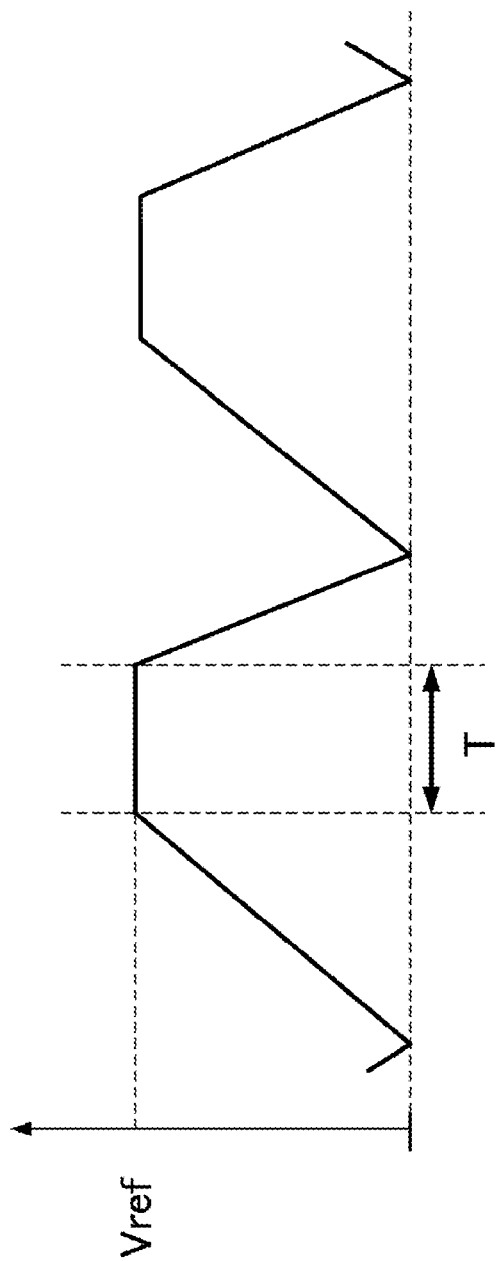
FIG. 9 is a diagram showing variation in the charging voltage of a capacitor in the oscillator circuit shown in FIG. 7.

Consequently, the capacitor C is charged by receiving current from the transistor q7 and, after the charging voltage thereof reaches the reference voltage Vref, is discharged by current drawn by the transistor q10 after the elapse of the period for which the transistor q52 is maintained in an off-state. As a result of this, an idle period T for which there is no charging or discharging of the capacitor C is variably set by the jitter control circuit 51, as schematically shown by the variation in the charging voltage of the capacitor C in FIG. 9. Further, by the idle period T being variably set, the duty ratio of a pulse signal that drives a switching element 4 on and off is variably set, whereby the switching frequency is controlled.

Also, when the switching frequency is set to the maximum oscillation frequency (region A), and when the switching frequency is set to the minimum oscillation frequency (region C), the current charging the auxiliary capacitor 27 is selectively set within a narrow range. Consequently, a long time is required to charge the auxiliary capacitor 27, and the idle period T is set to be long. Therefore, the switching amplitude with respect to the switching frequency, being controlled by the current from the transistors q11 to q14, is set to be small.

As opposed to this, the current charging the auxiliary capacitor 27 is selectively set within a wide range in the state wherein the switching frequency varies in accompaniment to the load fluctuation (region B). Consequently, in this case, the auxiliary capacitor 27 charging time decreases, as a result of which the idle period T is set to be short. Further, the capacitor C charging and discharging cycle becomes shorter by the amount by which the idle period T decreases, and the cycle of the pulse signal that drives the switching element 4 on and off becomes shorter. Therefore, the switching amplitude with respect to the switching frequency, being controlled by the current from the transistors q11 to q15, is set to be large.

Consequently, the variation range (jitter amplitude) of the jitter frequency with respect to the switching frequency is expanded when reaching a state wherein the switching frequency varies in accompaniment to a load fluctuation (region B). As a result of this, even when the amount of switching frequency fluctuation caused by feedback control accompanying a load fluctuation acts so as to cancel out the amount of switching frequency fluctuation caused by jitter control, it is possible to sufficiently secure the variation range (jitter amplitude) of the switching frequency caused by jitter control, in the same way as in each of the previously described embodiments.

The invention is not limited to the embodiments. For example, it is sufficient that the jitter amplitude with respect to the switching frequency, and the amount by which the jitter amplitude is expanded, are fixed in accordance with the specifications required of the switching power supply device main body 1. Also, it is sufficient that the control accuracy when executing jitter control, that is, the bit number of the up/down counter circuit 23, and the reference voltages Vref1, Vref2, and the like, set in the hysteresis comparators 24 and 25, are also set in accordance with the specifications.

Also, herein, the feedback voltage FB is evaluated using the hysteresis comparators 24 and 25, and the jitter amplitude variably set in steps by a shift to the operating state of the region A, B, or C being detected. However, in place of this kind of step-type control, it is also useful to control so that the jitter amplitude with respect to the switching frequency follows the variation in the feedback voltage FB, thus increasing incrementally or decreasing incrementally. Also, it is, of course, also possible to execute both the control so that the jitter amplitude increases incrementally or decreases incrementally and the step-form control, combined as appropriate. Various other modifications are possible, without departing from the scope of the invention.

What is claimed is:

1. A switching power supply device, comprising:
   a switching power supply device main body for generating a predetermined output DC voltage from an output AC voltage, the switching power supply device main body including a switching element and;
   a switching control unit for controlling a switching frequency of the switching element in accordance with a feedback voltage that indicates the difference between an output set voltage and the output DC voltage, the switching control unit including:
      a jitter control unit for applying jitter to the switching frequency to reduce noise accompanying a switching operation of the switching element, and a jitter amplitude control unit for changing the jitter amplitude caused by the jitter control unit in accordance with the feedback voltage, thereby maintaining a noise reduction effect.

2. The switching power supply device according to claim 1, wherein the jitter amplitude control unit widens the jitter amplitude when the feedback voltage is within a preset voltage range.

3. The switching power supply device according to claim 2, wherein the preset voltage range of the feedback voltage is set as a range up to and including a first threshold voltage at which the switching frequency begins to decrease in accompaniment to a decrease in the feedback voltage.

4. The switching power supply device according to claim 2, wherein the preset voltage range of the feedback voltage is set as a range above and including a second threshold voltage at which the switching frequency begins to rise in accompaniment to a rise in the feedback voltage.

5. The switching power supply device according to claim 2, wherein the preset voltage range of the feedback voltage is set as a range between a first threshold voltage at which the switching frequency begins to decrease in accompaniment to a decrease in the feedback voltage and a second threshold voltage, lower than the first threshold voltage, at which the switching frequency begins to rise in accompaniment to a rise in the feedback voltage.

6. The switching power supply device according to claim 2, wherein the jitter amplitude control unit determines whether or not the feedback voltage is included in the preset voltage range, and changes the jitter amplitude between a reference amplitude and an expanded amplitude wider than the reference amplitude.

7. The switching power supply device according to claim 6, wherein the jitter amplitude control unit determines whether or not the feedback voltage is included in the preset voltage range using a comparator having predetermined hysteresis characteristics.

8. The switching power supply device according to claim 2, wherein the jitter amplitude control unit increases the jitter amplitude incrementally from a reference amplitude to an expanded amplitude of an amplitude wider than the reference amplitude in accordance with the feedback voltage when the feedback voltage is included in the preset voltage range, and reduces the jitter amplitude incrementally from the expanded amplitude to the reference amplitude in accordance with the feedback voltage when the feedback voltage is outside the preset voltage range.

9. The switching power supply device according to claim 1, wherein the switching control unit controls a duty ratio of a signal that drives the switching element on and off in accordance with the feedback voltage, thereby causing the switching frequency to vary.

* * * * *